(12) United States Patent
Cuvo et al.

(10) Patent No.: US 11,725,756 B2
(45) Date of Patent: Aug. 15, 2023

(54) ADAPTER COUPLING

(71) Applicant: Victaulic Company, Easton, PA (US)

(72) Inventors: Anthony J. Cuvo, Coopersburg, PA (US); Matthew A. Bowman, Palmer, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 15/387,894

(22) Filed: Dec. 22, 2016

(65) Prior Publication Data
US 2017/0184226 A1 Jun. 29, 2017

Related U.S. Application Data
(60) Provisional application No. 62/271,395, filed on Dec. 28, 2015.

(51) Int. Cl.
*F16L 17/04* (2006.01)
*F16L 23/024* (2006.01)
(Continued)

(52) U.S. Cl.
CPC ............ *F16L 17/04* (2013.01); *F16L 23/024* (2013.01); *F16L 23/032* (2013.01); *F16L 23/22* (2013.01);
(Continued)

(58) Field of Classification Search
CPC ....... F16L 17/04; F16L 23/024; F16L 23/032; F16L 23/22; F16L 47/24; F16L 21/08; F16L 47/12; F16L 21/005; F16L 21/007
(Continued)

(56) References Cited

U.S. PATENT DOCUMENTS

| | | | |
|---|---|---|---|
| 659,888 A | * | 10/1900 | Douglas ................ F16L 23/032 220/693 |
| 1,020,123 A | | 3/1912 | Brampton et al. |

(Continued)

FOREIGN PATENT DOCUMENTS

| | | |
|---|---|---|
| CN | 1221089 A | 6/1999 |
| CN | 1959175 | 5/2007 |

(Continued)

OTHER PUBLICATIONS

Thomas, Shane; International Search Report and Written Opinion from counterpart International Patent Application No. PCT/US2016/068258; dated Mar. 16, 2017; pp. 1-10; United States Patent and Trademark Office as Searching Authority, Alexandria, Virginia USA.

(Continued)

*Primary Examiner* — Zachary T Dragicevich
*Assistant Examiner* — William S. Choi
(74) *Attorney, Agent, or Firm* — Ballard Spahr LLP

(57) ABSTRACT

A coupling for joining a flanged pipe element to a non-flanged pipe element has segments that are connected end to end and surround a central space. Flange portions extend from one side of the segments. Each segment defines two channels, one of which receives a split ring for gripping the non-flanged pipe; the other channel receives a seal. A flanged tube is also positioned between the segments. The flange of the tube is positioned adjacent to the flange portions of the segments. The seal engages the tube and the non-flanged pipe element. The flange portions of the segments are bolted to the flange of the flanged pipe element and the flange of the tube is captured between the flanged portions of the segments and the flange of the flanged pipe element.

16 Claims, 7 Drawing Sheets

(51) Int. Cl.
- *F16L 23/032* (2006.01)
- *F16L 23/22* (2006.01)
- *F16L 47/24* (2006.01)
- *F16L 47/14* (2006.01)
- *F16L 21/08* (2006.01)

(52) U.S. Cl.
CPC ............... *F16L 47/24* (2013.01); *F16L 21/08* (2013.01); *F16L 47/14* (2013.01)

(58) Field of Classification Search
USPC .... 285/368, 148.8, 197, 236, 253, 337, 364, 285/406, 411, 415, 420
See application file for complete search history.

(56) References Cited

U.S. PATENT DOCUMENTS

| | | | | |
|---|---|---|---|---|
| 1,074,395 | A | 9/1913 | Welch | |
| 1,203,989 | A | 11/1916 | Dehn | |
| 1,287,108 | A | 12/1918 | Robinson et al. | |
| 1,379,811 | A | 5/1921 | Fyffe | |
| 1,497,549 | A | 6/1924 | Conradi | |
| 1,649,594 | A | 11/1927 | Johnson | |
| 1,770,271 | A | 7/1930 | Hoppes | |
| 1,831,641 | A | 11/1931 | Skinner | |
| 1,834,968 | A * | 12/1931 | Rector | E21B 33/04 285/123.3 |
| 1,999,045 | A | 4/1935 | Goetz | |
| 2,021,081 | A | 11/1935 | Nagao | |
| 2,021,082 | A | 11/1935 | North | |
| 1,969,043 | A | 8/1937 | Sharp | |
| 2,094,258 | A | 9/1937 | Thompson | |
| 2,128,720 | A | 8/1938 | Tweedale | |
| 2,412,394 | A | 12/1946 | Giles | |
| 2,426,423 | A | 8/1947 | Woolsey | |
| 2,225,208 | A | 12/1947 | Crickmer | |
| 2,459,251 | A * | 1/1949 | Stillwagon | F16L 17/04 285/104 |
| 2,463,235 | A | 3/1949 | Andrews | |
| 2,491,004 | A | 12/1949 | Graham | |
| 2,635,901 | A | 4/1953 | Osborn | |
| 2,761,709 | A * | 9/1956 | Gilbert, Sr. | |
| 2,775,806 | A | 1/1957 | Love | |
| 2,926,028 | A | 2/1960 | Hookings et al. | |
| 2,958,546 | A | 11/1960 | Lee | |
| 3,014,259 | A | 12/1961 | Louis | |
| 3,054,629 | A | 9/1962 | Piatek | |
| 3,084,959 | A * | 4/1963 | Stanton | |
| 3,116,078 | A | 12/1963 | Scherer | |
| 3,142,502 | A | 7/1964 | Luther | |
| 3,148,896 | A | 9/1964 | Chu | |
| 3,153,550 | A | 10/1964 | Hollett | |
| 3,235,293 | A | 2/1966 | Condon | |
| 3,362,730 | A | 1/1968 | Clair et al. | |
| 3,414,297 | A * | 12/1968 | Pollia | F16L 23/02 285/110 |
| 3,466,069 | A | 9/1969 | Hoke et al. | |
| 3,479,066 | A * | 11/1969 | Gittleman | F16L 21/005 285/236 |
| 3,517,701 | A | 6/1970 | Smith | |
| 3,550,638 | A * | 12/1970 | Smith | F16L 23/167 138/99 |
| 3,596,935 | A | 8/1971 | McGeoch, Sr. | |
| 3,633,943 | A | 1/1972 | Ramm et al. | |
| 3,680,894 | A | 8/1972 | Young | |
| 3,768,819 | A | 10/1973 | Burkert | |
| 3,788,677 | A | 1/1974 | Stade et al. | |
| 3,794,360 | A | 2/1974 | Bachle et al. | |
| 3,825,286 | A | 7/1974 | Henry, III | |
| 3,861,723 | A | 1/1975 | Kunz et al. | |
| 3,920,270 | A | 11/1975 | Babb, Jr. | |
| 3,944,260 | A | 3/1976 | Petroczky | |
| 4,018,979 | A | 4/1977 | Young | |
| 4,073,514 | A | 2/1978 | Pate | |
| 4,119,333 | A | 10/1978 | Straub | |
| 4,123,090 | A | 10/1978 | Kotsakis et al. | |
| 4,225,160 | A | 9/1980 | Ortloff | |
| 4,273,367 | A | 6/1981 | Keeney et al. | |
| 4,284,298 | A | 8/1981 | Kaufmann, Jr. | |
| 4,372,587 | A | 2/1983 | Roche | |
| 4,408,788 | A | 10/1983 | Beukema | |
| 4,443,029 | A | 4/1984 | Laxo | |
| 4,461,498 | A | 7/1984 | Kunsman | |
| 4,471,979 | A | 9/1984 | Gibb et al. | |
| 4,522,434 | A * | 6/1985 | Webb | F16L 21/06 285/112 |
| 4,568,112 | A * | 2/1986 | Bradley, Jr | F16L 21/08 285/238 |
| 4,610,471 | A * | 9/1986 | Halen | F16L 47/14 285/148.13 |
| 4,611,839 | A | 9/1986 | Rung et al. | |
| 4,629,217 | A | 12/1986 | Straub | |
| 4,633,913 | A | 1/1987 | Carty et al. | |
| 4,639,020 | A | 1/1987 | Rung et al. | |
| 4,652,023 | A | 3/1987 | Timmons | |
| 4,664,422 | A | 5/1987 | Straub | |
| 4,678,208 | A | 7/1987 | De Raymond | |
| 4,702,499 | A | 10/1987 | deRaymond et al. | |
| 4,792,160 | A | 12/1988 | Hwang | |
| 4,819,974 | A | 4/1989 | Zeidler | |
| 4,838,584 | A | 6/1989 | Dierksmeier | |
| 4,842,306 | A | 6/1989 | Zeidler et al. | |
| 4,861,075 | A | 8/1989 | Pepi et al. | |
| 4,893,843 | A | 1/1990 | DeRaymond | |
| 4,896,902 | A | 1/1990 | Weston | |
| 4,898,407 | A | 2/1990 | Zeidler | |
| 5,018,768 | A | 5/1991 | Palatchy | |
| 5,022,685 | A | 6/1991 | Stiskin et al. | |
| 5,121,946 | A * | 6/1992 | Jardine | F16L 55/172 285/148.26 |
| 5,137,305 | A | 8/1992 | Straub | |
| 5,161,836 | A | 11/1992 | McKinnon | |
| 5,203,594 | A | 4/1993 | Straub | |
| 5,230,537 | A | 7/1993 | Newman | |
| 5,273,322 | A | 12/1993 | Straub | |
| 5,280,970 | A | 1/1994 | Straub | |
| 5,354,108 | A | 10/1994 | Sandor | |
| 5,437,482 | A * | 8/1995 | Curtis | F16L 23/028 285/148.13 |
| 5,452,922 | A | 9/1995 | Ziu | |
| 5,603,350 | A | 2/1997 | Stoll et al. | |
| 5,605,865 | A | 2/1997 | Maniar et al. | |
| 5,641,185 | A * | 6/1997 | Harth | F01N 13/1805 24/284 |
| 5,675,873 | A | 10/1997 | Groess | |
| 5,681,062 | A | 10/1997 | Fukao et al. | |
| 5,722,702 | A | 3/1998 | Washburn | |
| 5,758,907 | A | 6/1998 | Dole et al. | |
| 5,769,467 | A | 6/1998 | Bridges | |
| 5,772,257 | A | 6/1998 | Webb et al. | |
| 5,786,054 | A | 7/1998 | Platusich et al. | |
| 5,782,499 | A | 9/1998 | Esser | |
| 5,813,437 | A | 9/1998 | Esser | |
| 5,911,446 | A | 6/1999 | McLennan et al. | |
| 5,961,154 | A | 10/1999 | Williams et al. | |
| 6,030,006 | A | 2/2000 | Lin | |
| 6,056,332 | A | 5/2000 | Foster | |
| 6,065,784 | A | 5/2000 | Lundstrom | |
| 6,076,861 | A | 6/2000 | Ikeda | |
| 6,131,957 | A * | 10/2000 | Saito | F16L 21/04 285/133.21 |
| 6,276,726 | B1 | 8/2001 | Daspit | |
| 6,276,729 | B1 | 8/2001 | Sanwald et al. | |
| 6,305,719 | B1 | 10/2001 | Smith, Jr. et al. | |
| 6,328,352 | B1 | 12/2001 | Geppert et al. | |
| 6,367,849 | B1 | 4/2002 | Tatsuta et al. | |
| 6,450,551 | B1 | 9/2002 | Lee | |
| 6,499,771 | B1 | 12/2002 | Snyder, Sr. et al. | |
| 6,502,865 | B1 | 1/2003 | Steele | |
| 6,505,865 | B2 | 1/2003 | Minemyer | |
| 6,626,466 | B1 | 9/2003 | Dole | |
| 6,672,631 | B1 | 1/2004 | Weinhold | |
| 6,749,232 | B2 | 6/2004 | Wachter | |

(56) References Cited

U.S. PATENT DOCUMENTS

| | | |
|---|---|---|
| 7,070,209 B2 | 7/2006 | Collins |
| 7,086,131 B2 | 8/2006 | Gibb et al. |
| 7,090,259 B2 | 8/2006 | Dole |
| 7,341,287 B2 | 3/2008 | Gibb et al. |
| 7,434,846 B2 | 10/2008 | Baumgartner |
| 7,490,866 B2 | 2/2009 | Webb et al. |
| 7,500,699 B2 | 3/2009 | Snyder, Sr. et al. |
| 7,523,963 B2 | 4/2009 | Draper |
| 7,644,960 B2 | 1/2010 | Casey, Sr. et al. |
| 7,654,587 B2 | 2/2010 | Gibb et al. |
| 7,712,796 B2 | 5/2010 | Gibb et al. |
| 7,726,703 B2 | 6/2010 | Porter et al. |
| 7,789,434 B2 | 9/2010 | Nagle et al. |
| 7,798,535 B2 | 9/2010 | Calhoun |
| 7,841,630 B1 | 11/2010 | Auray et al. |
| 7,861,982 B1 | 1/2011 | McClure |
| 7,891,713 B2 | 2/2011 | Bekkevold |
| 7,921,536 B2 | 4/2011 | Dole |
| 7,988,207 B2 * | 8/2011 | Dole ............... F16L 17/04 285/112 |
| 7,996,981 B2 | 8/2011 | Dole et al. |
| 8,136,847 B2 * | 3/2012 | Madara ............ F16L 17/04 285/367 |
| 8,424,179 B2 | 4/2013 | Webb et al. |
| 8,517,430 B2 | 8/2013 | Dole et al. |
| 8,777,277 B2 | 7/2014 | Dole et al. |
| 8,820,795 B2 | 9/2014 | Dole |
| 8,827,214 B2 | 9/2014 | Ogawa |
| 9,151,422 B2 | 10/2015 | Kayacik et al. |
| 9,482,374 B2 * | 11/2016 | Henry .............. F16L 17/032 |
| 9,791,083 B2 | 10/2017 | Gibb |
| 9,890,884 B1 | 2/2018 | Chiproot |
| 9,976,677 B2 | 5/2018 | Lurk |
| 10,458,579 B2 | 10/2019 | Bowman et al. |
| 10,627,025 B2 | 4/2020 | Bowman et al. |
| 10,731,780 B2 | 8/2020 | Bowman et al. |
| 10,859,190 B2 | 12/2020 | Bowman et al. |
| 2002/0135184 A1 | 9/2002 | Snyder, Sr. et al. |
| 2002/0185868 A1 | 12/2002 | Snyder, Sr. et al. |
| 2003/0020276 A1 | 1/2003 | Steele |
| 2004/0237632 A1 | 12/2004 | Van Keeken |
| 2005/0001428 A1 | 1/2005 | Scherrer |
| 2005/0028366 A1 | 2/2005 | Bien et al. |
| 2005/0067538 A1 | 3/2005 | Stigler |
| 2005/0082831 A1 | 4/2005 | Borland |
| 2005/0212284 A1 * | 9/2005 | Dole ............... B21D 17/04 285/110 |
| 2005/0253380 A1 | 11/2005 | Gibb et al. |
| 2006/0087121 A1 * | 4/2006 | Bradley ............ F16L 21/08 285/415 |
| 2006/0138776 A1 | 6/2006 | Amedure et al. |
| 2006/0208486 A1 * | 9/2006 | Kim ............... F16L 21/06 285/364 |
| 2006/0214422 A1 | 9/2006 | Cuvo et al. |
| 2007/0024056 A1 | 2/2007 | Borland |
| 2007/0090464 A1 | 4/2007 | Dole et al. |
| 2007/0296213 A1 * | 12/2007 | Jones ............... F16L 25/12 285/421 |
| 2008/0007061 A1 | 1/2008 | Gibb |
| 2008/0054636 A1 * | 3/2008 | Reid ............... F16L 21/065 285/411 |
| 2008/0093847 A1 * | 4/2008 | Sundholm ........ F16L 23/0283 285/368 |
| 2008/0129048 A1 | 6/2008 | Nagle et al. |
| 2008/0265568 A1 | 10/2008 | Bekkevold |
| 2008/0272595 A1 | 11/2008 | Gibb et al. |
| 2008/0284161 A1 | 11/2008 | Dole et al. |
| 2009/0127846 A1 | 5/2009 | Dole et al. |
| 2009/0160183 A1 | 6/2009 | Felber |
| 2009/0172939 A1 | 7/2009 | Dole |
| 2009/0206598 A1 | 8/2009 | Gibb et al. |
| 2010/0148493 A1 | 6/2010 | Madara et al. |
| 2010/0197627 A1 | 8/2010 | Baudoin et al. |
| 2010/0289257 A1 | 11/2010 | Madara et al. |
| 2010/0296925 A1 | 11/2010 | Sakai |
| 2010/0320756 A1 | 12/2010 | Gibb et al. |
| 2010/0320758 A1 | 12/2010 | Sisk |
| 2010/0327576 A1 | 12/2010 | Linhorst et al. |
| 2011/0062706 A1 | 3/2011 | Henry |
| 2011/0154646 A1 | 6/2011 | Hagiya |
| 2011/0254268 A1 | 10/2011 | Johnson et al. |
| 2012/0025524 A1 * | 2/2012 | Krausz ............. F16L 21/08 285/421 |
| 2012/0061956 A1 * | 3/2012 | Nijsen ............. F16L 21/04 285/374 |
| 2012/0074689 A1 | 3/2012 | Petersen et al. |
| 2012/0098259 A1 | 4/2012 | Sarkisian et al. |
| 2012/0205909 A1 | 8/2012 | Bird |
| 2012/0235405 A1 | 9/2012 | Dole et al. |
| 2012/0256415 A1 * | 10/2012 | Dole ............... F16L 17/04 285/337 |
| 2012/0256418 A1 | 10/2012 | Horgan |
| 2013/0127160 A1 | 5/2013 | Bancroft et al. |
| 2013/0181446 A1 | 7/2013 | Le Clinche |
| 2013/0200610 A1 | 8/2013 | Cygler, III et al. |
| 2013/0327415 A1 | 12/2013 | Camp, Jr. et al. |
| 2014/0070529 A1 * | 3/2014 | Bancroft ............ F16L 21/005 285/337 |
| 2014/0239633 A1 * | 8/2014 | Swingley ........... F16L 23/003 285/368 |
| 2014/0327238 A1 | 11/2014 | Bowman |
| 2015/0001846 A1 * | 1/2015 | Griffin ............. F16L 23/02 285/368 |
| 2015/0021911 A1 | 1/2015 | Bowman et al. |
| 2015/0176728 A1 | 6/2015 | Bowman |
| 2015/0204471 A1 | 7/2015 | Sato |
| 2016/0084420 A1 | 3/2016 | Barrientos |
| 2017/0184226 A1 | 6/2017 | Cuvo et al. |
| 2017/0328500 A1 | 11/2017 | Bowman et al. |
| 2017/0328507 A1 | 11/2017 | Sith et al. |
| 2018/0163905 A1 | 6/2018 | Ohnemus et al. |
| 2018/0163906 A1 | 6/2018 | Ohnemus et al. |
| 2018/0200550 A1 | 7/2018 | Bancroft et al. |
| 2019/0032824 A1 | 1/2019 | McNamara et al. |
| 2019/0032825 A1 | 1/2019 | McNamara et al. |

FOREIGN PATENT DOCUMENTS

| | | |
|---|---|---|
| CN | 101886721 A | 11/2010 |
| CN | 102345774 | 2/2012 |
| CN | 102933886 | 2/2013 |
| CN | 104204640 A | 12/2014 |
| CN | 105423015 | 3/2016 |
| CN | 105473923 | 4/2016 |
| DE | 3111997 | 10/1982 |
| DE | 3443942 A1 | 6/1985 |
| DE | 3443943 A1 | 6/1985 |
| DE | 19553356 | 4/1996 |
| DE | 10006029 | 8/2001 |
| DE | 202012011293 | 1/2013 |
| EP | 0462454 | 12/1991 |
| EP | 2113701 A1 | 4/2009 |
| EP | 2112414 A1 | 10/2009 |
| EP | 2113701 | 11/2009 |
| EP | 1840439 | 6/2010 |
| EP | 2487397 | 8/2012 |
| FR | 2683017 A1 | 4/1993 |
| FR | 2747453 | 4/1997 |
| FR | 2921985 | 3/2013 |
| GB | 2098297 A | 11/1982 |
| GB | 2211255 A | 8/1989 |
| JP | S52126317 | 3/1951 |
| JP | 5615891 | 7/1979 |
| JP | 59004228 | 2/1984 |
| JP | S524772 | 2/1993 |
| JP | 6147362 | 5/1994 |
| JP | 07269764 | 10/1995 |
| JP | 2001304468 | 10/2001 |
| JP | 2002147664 | 5/2002 |
| JP | 2006250247 | 9/2006 |
| JP | 2007537414 | 12/2007 |
| JP | 2008202791 | 9/2008 |

(56) References Cited

FOREIGN PATENT DOCUMENTS

| | | | | |
|---|---|---|---|---|
| JP | 2009167971 | 7/2009 | | |
| JP | 2011163474 | 8/2011 | | |
| JP | 2012026578 | 2/2012 | | |
| JP | 2012189147 | 10/2012 | | |
| JP | 2013542382 | 11/2013 | | |
| JP | 2014001848 | 1/2014 | | |
| KR | 100315861 B1 | 11/2001 | | |
| KR | 20090007813 A | 1/2009 | | |
| KR | 20090042557 A | 4/2009 | | |
| KR | 100904419 | 6/2009 | | |
| KR | 20090066767 A | 6/2009 | | |
| WO | 9703811 | 2/1997 | | |
| WO | WO-0159350 A1 * | 8/2001 | ............. | F16L 17/04 |
| WO | 2005114023 A2 | 12/2005 | | |
| WO | 2008144332 A1 | 11/2008 | | |
| WO | 2013077966 A1 | 5/2013 | | |

OTHER PUBLICATIONS

Author Unknown, DUDECO Product catalog; publication date unknown, pp. 1-16; obtained online at www.jcoupling.com.

Author Unknown, ANVIL International Product Catalog; publication date Sep. 2015; pp. 1-3, obtained online at http://www.anvilintl.com/usercontent/submittal-info-sheet/4593_GV-SUB-FIG7312.pdf.

Non-final Office Action in U.S. Appl. No. 15/593,662, titled "Sprung Coupling"; dated Jun. 24, 2019; 5 pages.

Final Office Action in U.S. Appl. No. 15/593,662, titled "Sprung Coupling"; dated Jan. 30, 2020; 7 pages.

Non-final Office Action in U.S. Appl. No. 16/413,737, titled "Sprung Coupling"; dated Aug. 26, 2019; 8 pages.

Non-final Office Action in U.S. Appl. No. 16/816,780, titled "Sprung Coupling"; dated Jun. 8, 2020; 6 pages.

* cited by examiner

ADAPTER COUPLING

CROSS REFERENCE TO RELATED APPLICATION

This application is based upon and claims the benefit of priority to U.S. Provisional Application No. 62/271,395, filed Dec. 28, 2015 and hereby incorporated by reference.

FIELD OF THE INVENTION

This invention relates to mechanical couplings for joining pipe elements end to end, and in particular, for joining flanged pipe elements to non-flanged pipe elements.

BACKGROUND

As taught in the prior art, connecting a non-flanged polymer pipe element to a flanged pipe element of either polymer or metal, requires the use of a backing ring, usually made of metal, and a polymer butt flange adapter. To effect the connection, the backing ring is slipped over the free end of the non-flanged polymer pipe element and then the butt flange adapter is coaxially aligned with and fused to the free end of the non-flanged pipe element in a butt joint. This creates a flanged facing on the previously non-flanged polymer pipe element which is then engaged, flange to flange, with the flanged pipe element. The backing ring is then brought to bear on the flange of the butt flange adapter and bolts are used to attach the backing ring to the flange of the flanged pipe element, capturing and retaining the flange of the butt flange adapter to the flanged pipe element. For polymer to metal flange engagement under low pressure applications the soft polymer flange of the butt flange adapter deforms upon contact with the metal flange of the flanged pipe element to form a fluid-tight seal. For higher pressure applications a face seal may be used between the interfacing flanges to ensure fluid tightness.

While effective, this prior art practice suffers various disadvantages. Multiple parts, namely, the butt flange adapter and the backing ring, must be supplied and assembled onto the non-flanged polymer pipe element. A fusing operation is necessary to join the butt flange adapter to the non-flanged polymer pipe. This requires a fusing machine, which requires power or a heat source for operation. The fusing operation itself takes time and is affected by the weather when joints are to be made in the field. For example, cold weather will slow the fusing process, and can stop it entirely if severe enough. There is clearly a need for improved components and a method for joining non-flanged polymer pipe elements to flanged pipe elements.

SUMMARY

The invention concerns a coupling for joining a flanged pipe element to a plain end pipe element. In one example embodiment the coupling comprises a plurality of segments attached to one another in spaced apart relation end to end surrounding a central space. By way of example each of the segments comprises first and second sides oppositely disposed. A first channel is positioned proximate to the first side and extends circumferentially around and facing the central space. A first flange is positioned proximate to the second side and extends outwardly away from the central space. The first flange has a plurality of holes therethrough. A second channel is positioned between the first channel and the flange and extends circumferentially around and faces the central space. The coupling further comprises a split ring positioned in the first channel. A seal is positioned in the second channel. A tube is positioned within the central space and extends outwardly from the second sides of the segments. The tube engages the seal. A second flange may extend outwardly from the tube and positioned adjacent to the first flange. A barb may extend outwardly from the tube proximate one end thereof.

In an example embodiment the first channel comprises two side surfaces arranged in spaced relation. At least one of the segments may have at least one notch positioned in the two side surfaces adjacent to an end of the at least one segment. A floor surface extends between the side surfaces. The floor surface comprises first and second surface portion arranged respectively at opposite ends of the segments. A third surface portion is positioned between the first and second surface portions. The first and second surface portions each have a radius of curvature greater than a radius of curvature of the third surface portion. In a specific example embodiment the radius of curvature of the first and second surface portions on at least one of the segments is equal to an outer radius of curvature of the split ring. By way of further example, at least one of the first and second surface portions has a length extending from 5% to 45% of a total circumferential length of the first channel.

In an example embodiment the seal comprises a flexible, resilient sealing ring having first and second ring inner surfaces adapted to respectively engage outer surfaces of the tube and the pipe element. One of the ring inner surfaces has a diameter sized to receive the pipe element upon insertion of the pipe elements between the segments. Further by way of example, the seal has an outer surface engaged with and supporting the segments in a preassembled state in spaced apart relation sufficient to allow the pipe element to be inserted into the central space. In an example embodiment, the split ring has an outer radius of curvature and an inner radius of curvature. The inner radius of curvature is equal to or greater than an outer radius of the pipe element.

In an example embodiment, the split ring supports the segments in a preassembled state in spaced apart relation sufficient to allow the pipe elements to be inserted into the central space. By way of further example, the split ring has sufficient stiffness to maintain the segments in the preassembled state through handling of the coupling during insertion of the pipe element. By way of further example, the split ring comprises a plurality of teeth arranged in spaced relation to one another and extending circumferentially around the split ring, the teeth projecting toward the central space.

In an example embodiment the segments comprise adjustably tightenable attachment members for drawing the segments toward the central space. In a specific example, the adjustably tightenable attachment members comprise projections extending from opposite ends of each segment. Each projection defines an opening for receiving a fastener. The fasteners extend between the segments and hold the segments together in a preassembled state.

DETAILED DESCRIPTION

Figure 1:
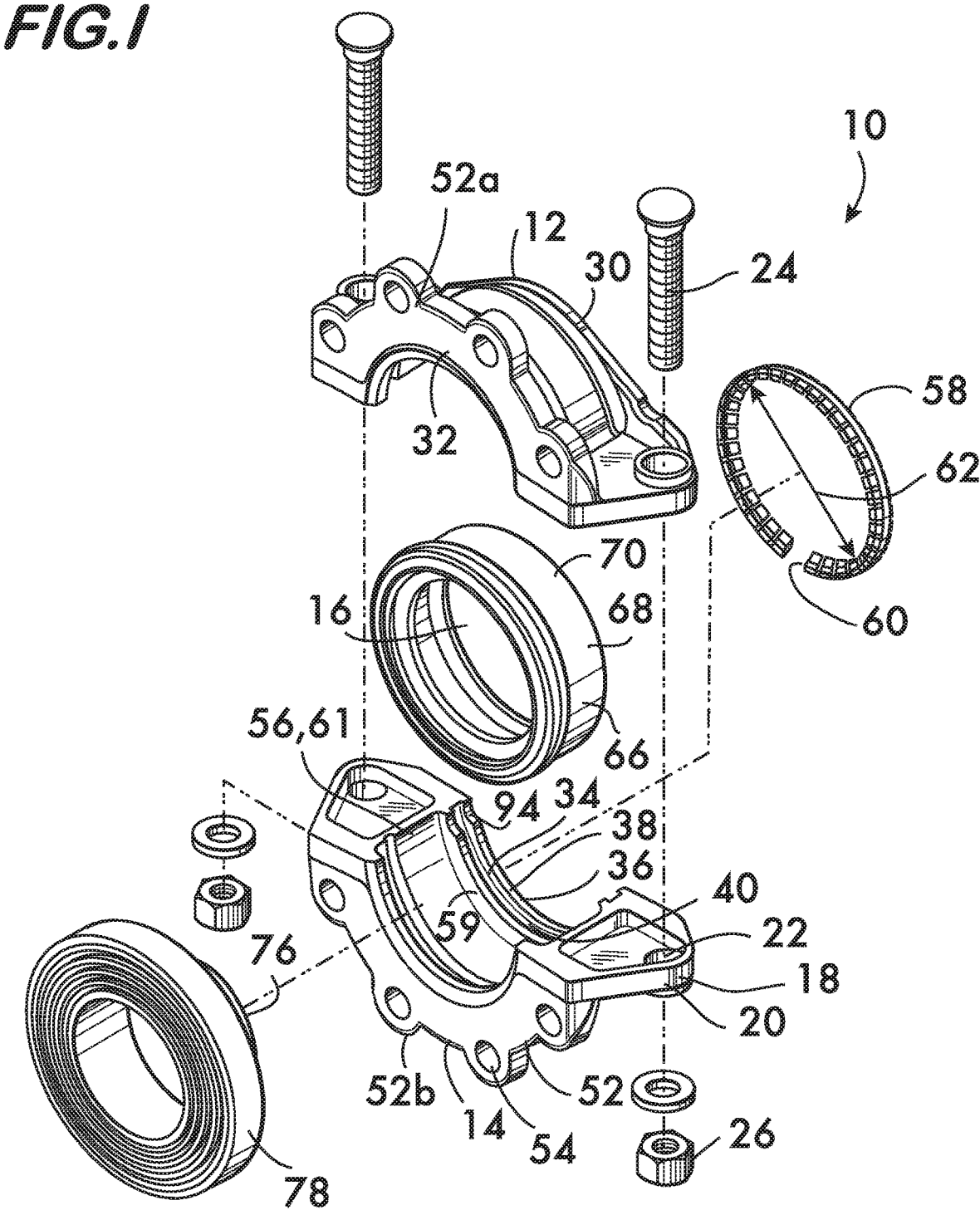
FIG. 1 is an isometric exploded view of an example coupling according to the invention.
Figure 4:
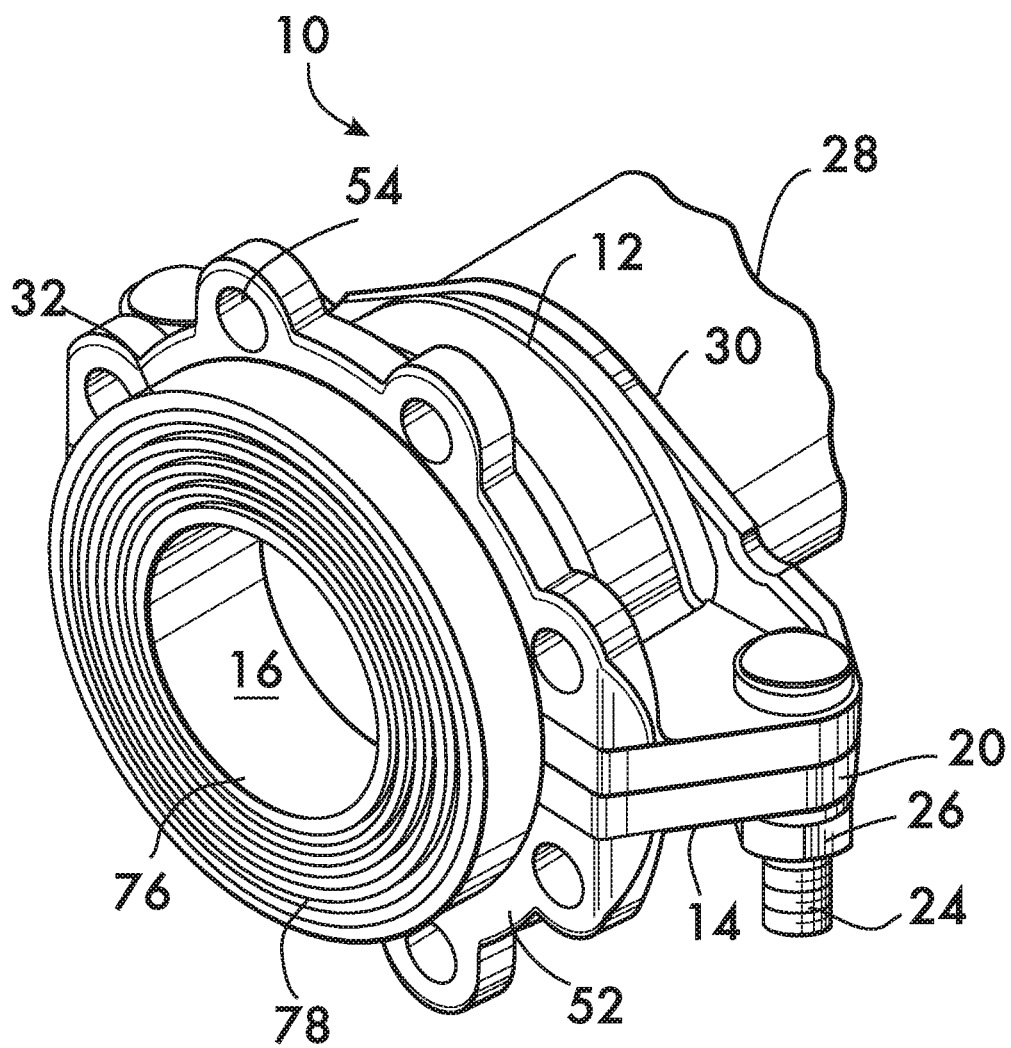
FIG. 4 is an isometric view of the coupling shown in FIG. 1 shown engaging a non-flanged pipe element.
Figure 5:
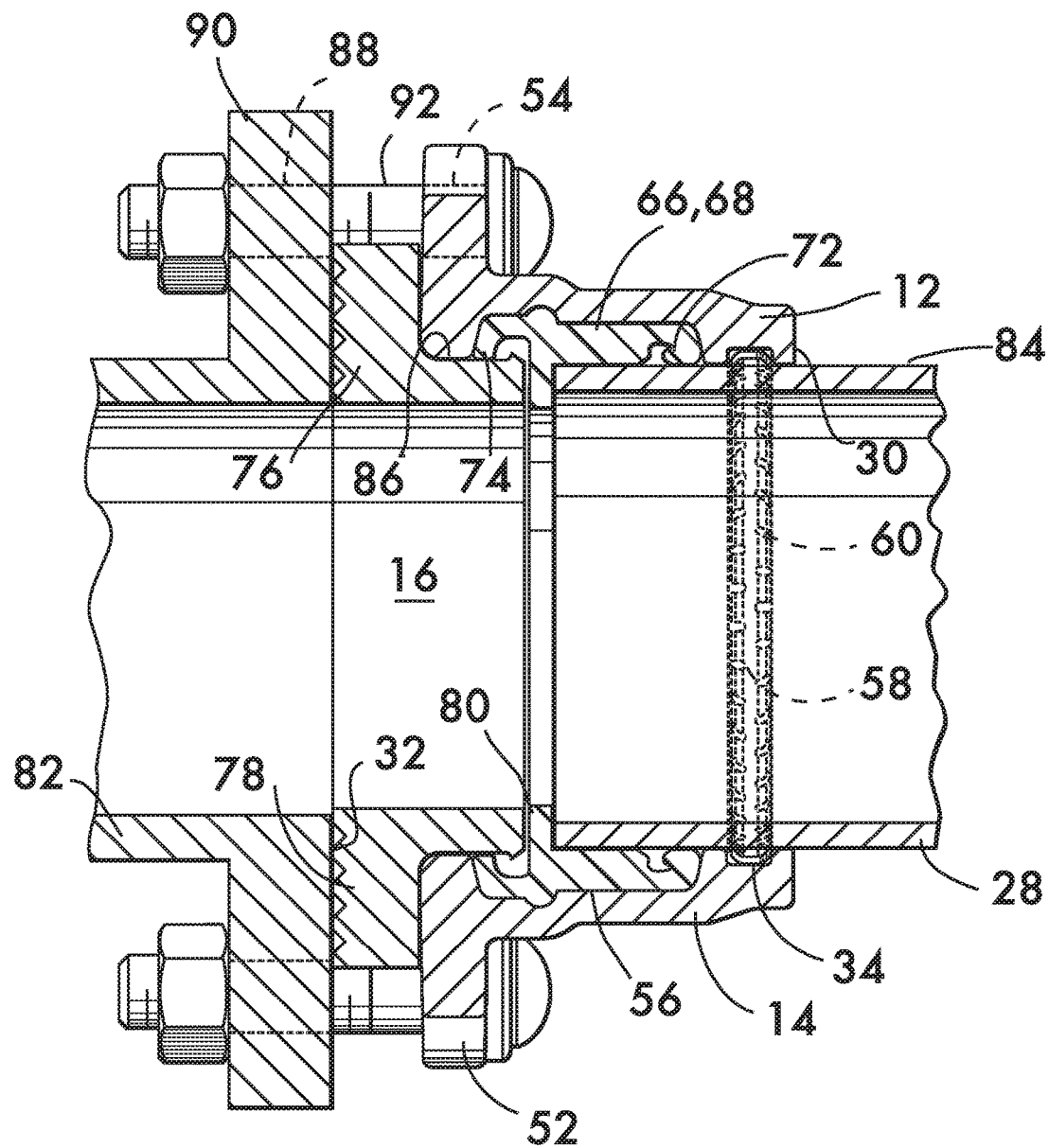
FIG. 5 is a longitudinal sectional view showing the coupling of FIG. 1 connecting a flanged pipe element to a non-flanged pipe element.

FIG. 1 shows an example embodiment of a coupling 10 for joining flanged pipe elements to non-flanged pipe elements according to the invention. Coupling 10 comprises a plurality of segments, in this example, two segments 12 and 14 attached to one another end to end and surrounding a central space 16. Segments 12 and 14 are advantageously formed of cast ductile iron, although other materials may also be used. Attachment of the segments 12 and 14 is effected via adjustable attachment members 18 positioned at each end of each segment. In this example attachment members 18 comprise projections 20 that extend from the ends of the segments, the projections having openings 22 that receive a fastener, such as bolt 24 and nut 26. Upon tightening of the fasteners 24, 26 the segments 12 and 14 are drawn toward one another and the central space 16 to effect connection with a pipe element 28 as shown in FIGS. 4 and 5 and described below.

Figure 2:
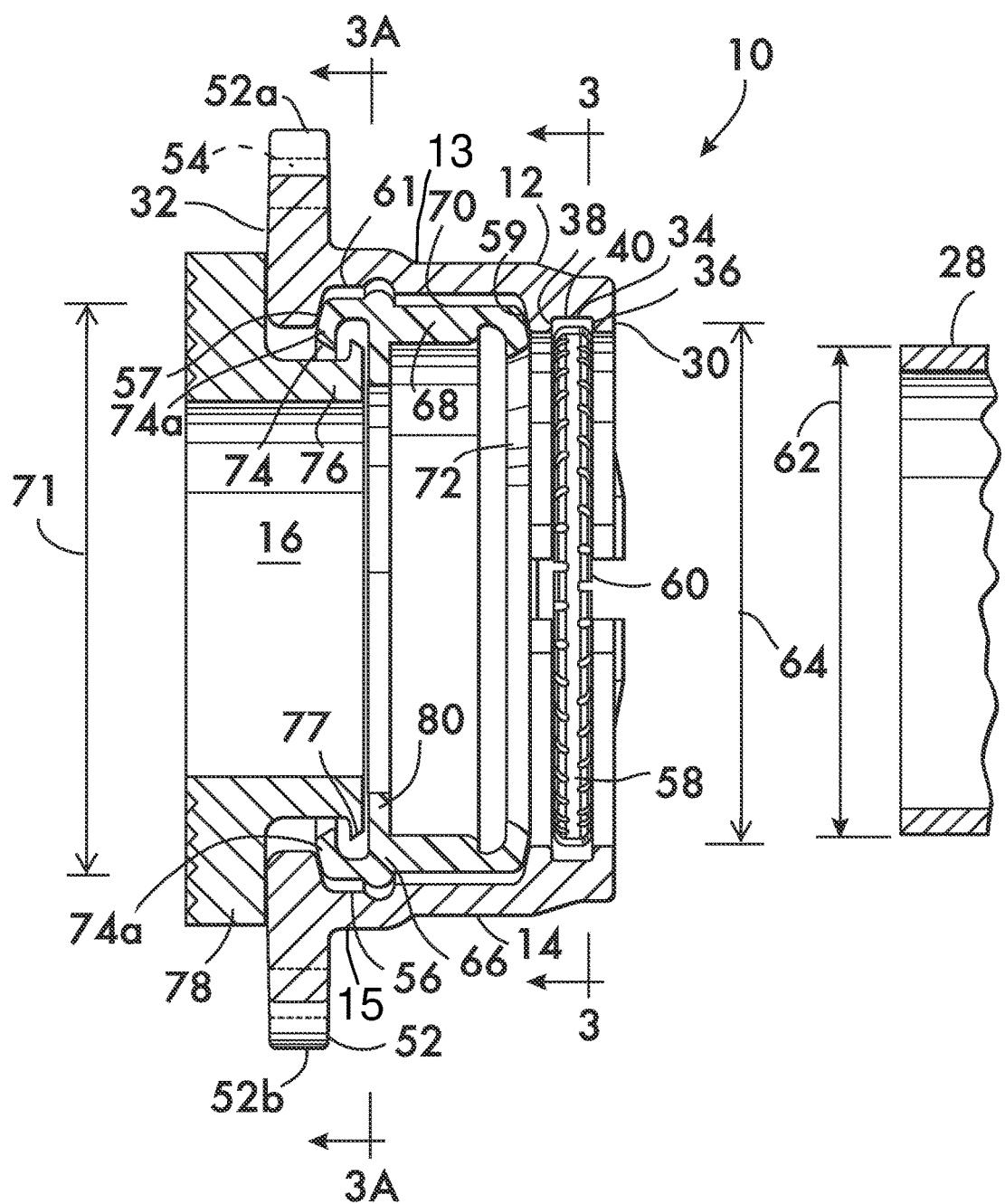
FIG. 2 is a longitudinal sectional view taken at line 2-2 of FIG. 1A.
Figure 3:
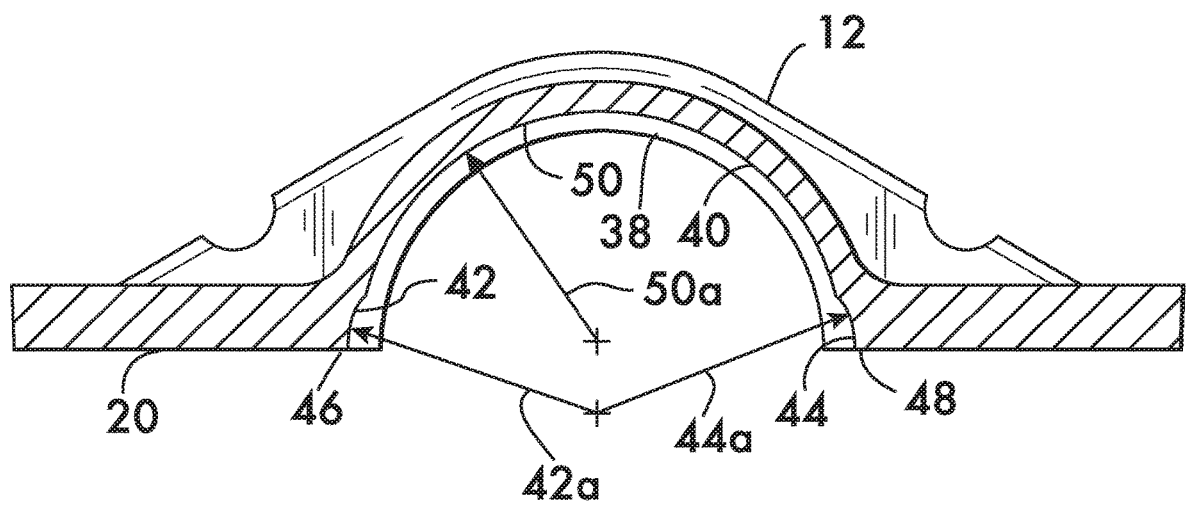
FIG. 3 is a cross sectional view taken at line 3-3 of FIG. 2.

As shown in FIG. 2, coupling 10 has first and second sides 30 and 32 oppositely disposed from one another. A first channel 34 is positioned in the segments 12 and 14 proximate to the first side 30. First channels 34 extend circumferentially around and face the central space 16. First channels 34 are each defined by two side surfaces 36 and 38 arranged in spaced apart relation to one another. A floor surface 40 extends between the side surfaces. As shown in FIG. 3, the floor surface 40 comprises first and second surface portions 42 and 44 arranged respectively at opposite ends 46 and 48 of the segments 12 and 14 (segment 12 being shown). A third surface portion 50 is positioned between the first and second surface portions 42 and 44. Each surface portion 42, 44 and 50 has a respective radius of curvature 42a, 44a and 50a. Radii 42a and 44a are greater than the radius of curvature 50a of the third surface portion 50. The centers of radii 42a and 44a are offset from the center of radius 50a as depicted in FIG. 3. The first and second surface portions 42 and 44 may each have a length extending from about 5% to about 45% of the total length of the first channel 34 for practical coupling designs.

Figure 3A:
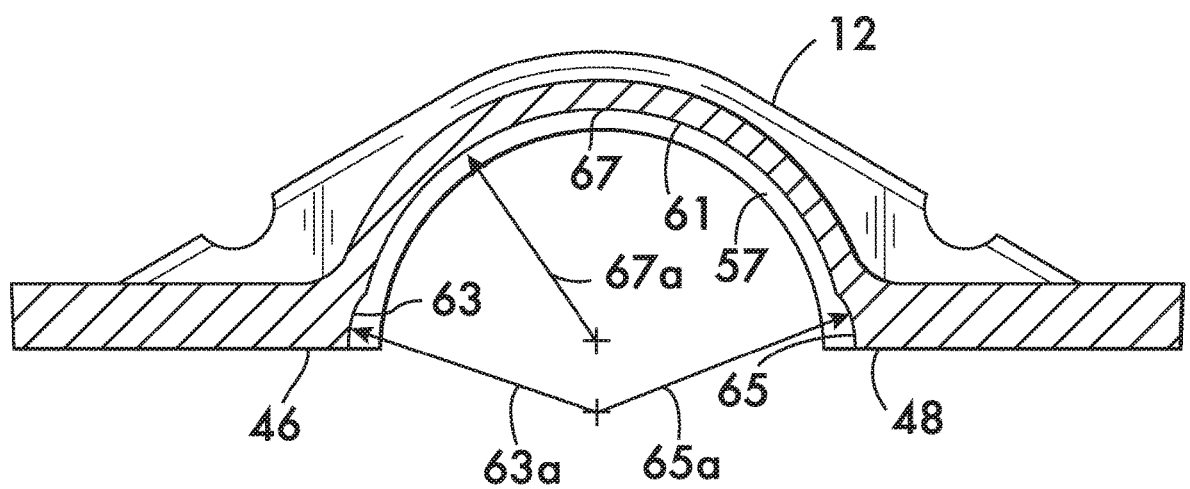
FIG. 3A is a cross sectional view taken at line 3A-3A of FIG. 2.

As shown in FIGS. 1 and 2, coupling 10 further comprises a first flange 52 positioned proximate to the second sides 32 of each segment 12 and 14. Flange 52 is formed of flange portions 52a and 52b on respective segments 12 and 14 and extends outwardly away from the central space 16 and exterior surfaces 13, 15 of the respective segments 12 and 14. Flange 52 has a plurality of through holes 54 (see also FIG. 1A) positioned outwardly of the exterior surfaces 13, 15 of the respective segments 12 and 14. The flange 52 and through holes 54 are designed to mate with the flange of a flanged end pipe element as described below. A second channel 56 is positioned in each segment 12, 14 between the first channels 34 and the first flanges 52. Second channels 56 extend circumferentially around and face the central space 16. Similar to first channels 34, second channels 56 are each defined by two side surfaces 57 and 59 arranged in spaced apart relation to one another as shown in FIG. 2. A floor surface 61 extends between the side surfaces. As shown in FIG. 3A, the floor surface 61 comprises first and second surface portions 63 and 65 arranged respectively at opposite ends 46 and 48 of the segments 12 and 14 (segment 12 being shown). A third surface portion 67 is positioned between the first and second surface portions 63 and 65. Each surface portion 63, 65 and 67 has a respective radius of curvature 63a, 65a and 67a. Radii 63a and 65a are greater than the radius of curvature 67a of the third surface portion 67. The centers of radii 63a and 65a are offset from the center of radius 67a as depicted in FIG. 3A. The first and second surface portions 63 and 65 may each have a length extending from about 5% to about 45% of the total length of the second channel 56 for practical coupling designs.

As shown in FIGS. 1 and 2, a split ring 58 is positioned within the first channels 34 of segments 12 and 14. Split ring 58 in this example comprises a plurality of teeth 60 arranged in spaced relation to one another. Teeth 60 extend circumferentially around the split ring 58 and project toward the central space 16. Such split rings are made of metal, such as spring steel, stainless steel or copper-beryllium alloys and are effective at retaining pipe elements made of HDPE or other polymer resins, to the coupling 10. The split ring 58 has an inner diameter 62 equal to or greater than the outer diameter of the pipe element. Teeth 60 may furthermore be angularly oriented to permit insertion of the pipe element into central space 16, but prevent its withdrawal.

Figure 1A:
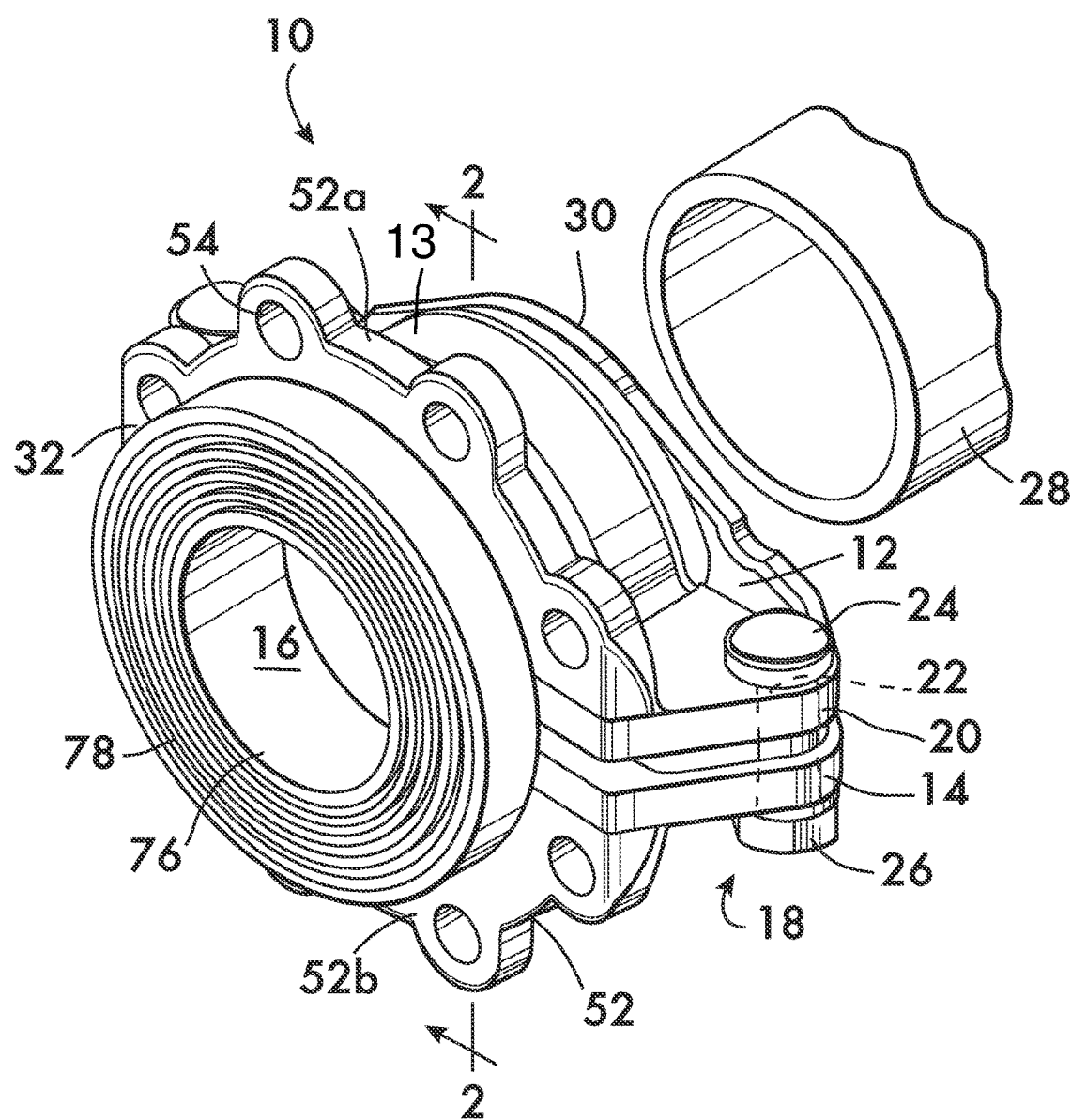
FIG. 1A is an isometric view of an example coupling according to the invention shown in a preassembled state.

Split ring 58 may be used to hold the segments 12 and 14 in spaced apart relation in the so-called "preassembled state", illustrated in FIG. 1A. Split ring 58 has an outer diameter 64 sized to engage the first and second surface portions 42 and 44 of floor surface 40 (see FIG. 3). These surface potions have radii of curvature 42a and 44a larger than the third surface portion 50 and are designed to cooperate with the split ring 58 for support of the segments 12 and 14 such that the pipe element 28 may be inserted into the central space 16 from side 30 when coupling 10 is in the preassembled state. Fasteners (bolts 24 and nuts 26) hold the segments 12 and 14 together and against the split ring 58, which has sufficient stiffness to support the segments during handling for installation but, being a split ring, is collapsible to a smaller diameter and permits the segments to be drawn toward one another and effect a fluid tight, mechanically restrained joint when the fasteners are tightened as described below.

Fluid tightness of the joint is afforded by a seal 66 positioned in the second channels 56 of segments 12 and 14 as shown in FIG. 2. In this example seal 66 comprises a flexible, resilient sealing ring 68. Sealing ring 68 has an outer surface 70 having a diameter 71. In an example embodiment, diameter 71 is sized either to support the segments 12 and 14 in spaced relation in the preassembled state, or to assist split ring 58 in supporting the segments. To this end outer diameter 71 is sized to engage the first and second surface portions 63 and 65 of floor surface 61 of the second channel 56 (see FIG. 3A). These surface portions have radii of curvature 63a and 65a larger than the third surface portion 67 and are designed to cooperate with the sealing ring 68 for support of the segments 12 and 14 to permit insertion of the pipe element 28 into the central space 16 from side 30 when coupling 10 is in the preassembled state shown in FIG. 1A. Sealing ring 68 may also have sufficient stiffness to support the segments during handling for installation. Sealing ring 68 may be formed of elastomers such as EPDM and is thus deformable upon tightening of the fasteners 24, 26 to permit a joint to be formed as described below.

To effect a fluid tight seal, sealing ring 68 has first and second ring inner surfaces 72 and 74 positioned on opposite sides of the sealing ring. Surface 72 is positioned and adapted to engage the outer surface of pipe element 28 upon insertion of the pipe element into the central space 16 (described below). As shown in FIG. 2, surface 74 is adapted to engage the outer surface of a tube 76 positioned within the central space 16. A barb 77 is positioned proximate one end of tube 76 to engage the lobe 74a on which inner surface 74 is positioned. Barb 77 extends circumferentially around and outwardly from tube 76 and helps retain the tube within sealing ring 68. Tube 76 is part of the coupling 10 and extends outwardly from the second sides 32 of the segments 12 and 14. A second flange 78 may extend outwardly from tube 76 and is positioned in spaced relation away from barb 77, adjacent to the first flange 52 when the opposite end of the tube 76 is engaged by the inner surface 74 of sealing ring 68 as illustrated in FIG. 2. It is advantageous to form tube 76 and its flange 78 as a unitary piece from a polymer resin such as HDPE. This design helps ensure fluid tightness of the joint as noted below. Sealing ring 68 may also have an inwardly projecting rib 80 that engages both the tube 76 and the pipe element 28 and acts as a stop to ensure proper depth of engagement between these components and the coupling 10.

Figure 6:
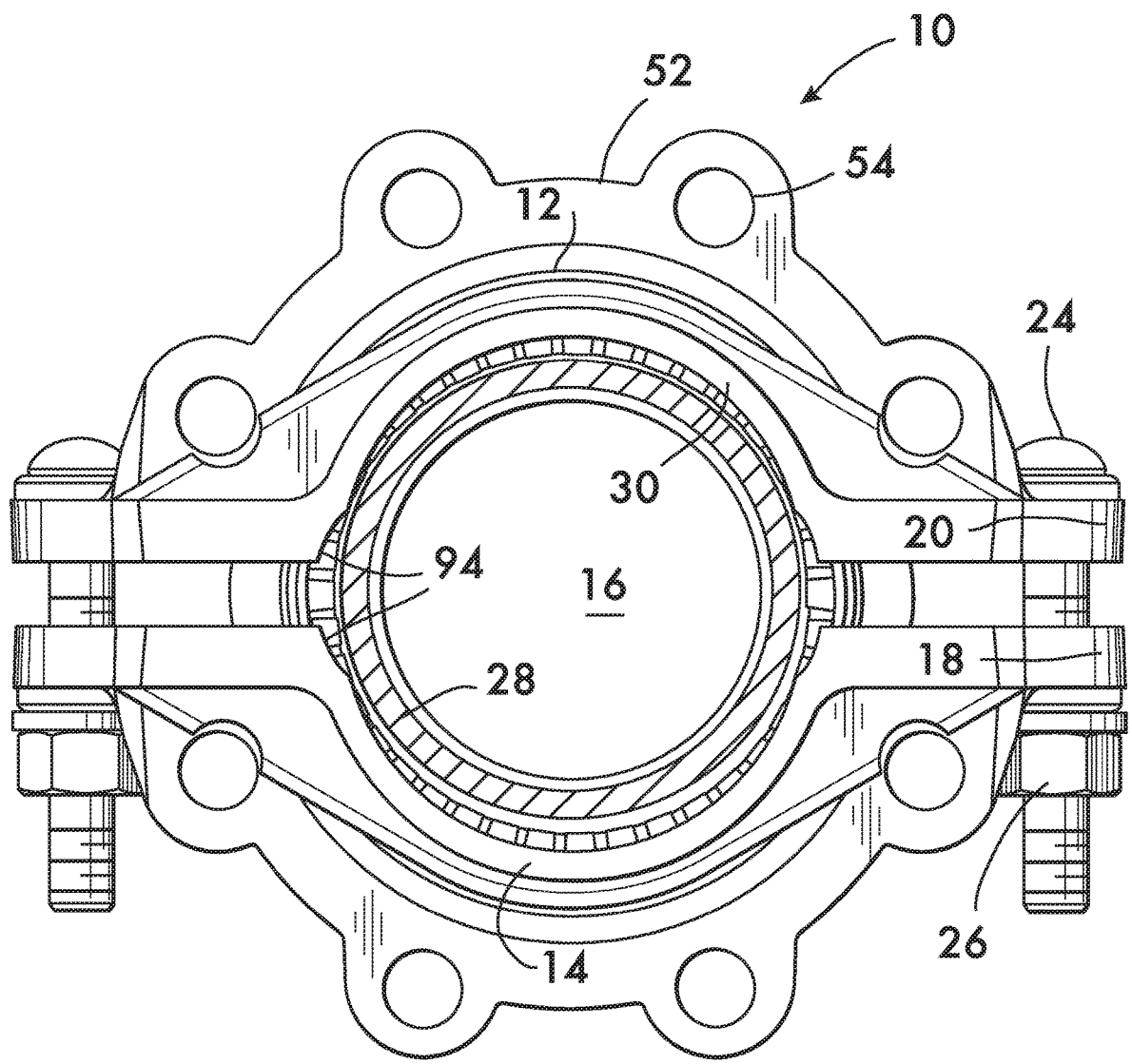
FIG. 6 is an axial view of the coupling shown in FIG. 1.

Installation of the coupling 10 is illustrated with reference to FIGS. 1A, 4, 5 and 6. Pipe element 28 is to be connected to a flanged pipe element 82 (see FIG. 5). As shown in FIGS. 1A and 6, the pipe element 28 is inserted into the central space 16 of coupling 10 from the first side 30 of the segments 12 and 14. Insertion is possible because the coupling 10 is in the preassembled state, with segments 12 and 14 supported in spaced relation either on seal 66 alone, split ring 58 alone, or on both the seal and the split ring. Insertion is further aided by notches 94 positioned in side surfaces 36, 38 of each segment 12 and 14. The notches 94 are positioned adjacent to the attachment members 18 (projections 20) and provide clearance for pipe element insertion which permits the segments 12 and 14 to be closer together in the preassembled state than would be possible in the absence of the notches. Once pipe element 28 is properly seated (the end engaging stop rib 80, the sealing ring inner surface 72 engaging the outer surface of the pipe element) fasteners 24, 26 are tightened thereby drawing segments 12 and 14 toward one another as shown in FIGS. 4 and 5. Motion of the segments 12 and 14 deforms both the split ring 58 and the seal 66.

Split ring 58 shrinks in circumference and diameter as it is forced to conform within the first channel 34. Shrinking of split ring 58 causes teeth 60 on the split ring to bite into the outer surface of the pipe element 28 and prevent its withdrawal from the coupling 10. Seal 66, constrained within the second channel 56, is compressed between the segments 12 and 14 as the segments are brought together. As shown in FIG. 5, the sealing ring inner surface 72 is forced into sealing engagement with the outer surface 84 of the pipe element 28, and sealing ring inner surface 74 is brought into sealing engagement with the outer surface 86 of tube 76.

With the segments 12 and 14 brought together as depicted in FIGS. 4 and 5, the first flange 52 is thus arranged so that its holes 54 may be aligned with corresponding holes 88 in the flange 90 of the flanged pipe element 82 to which the pipe element 28 is to be joined. As shown in FIG. 5, the coupling 10 is aligned with the flanged pipe element 82, holes 54 in the first flange 52 are aligned with holes 88 in flange 90 and fasteners 92 are received in holes 54 and 88 to connect the first flange 52 to the flange 90 of the flanged pipe element 82. Second flange 78 of tube 76 is captured between flange 90 and first flange 52. This configuration provides stiffness and stability to the joint as well as fluid tightness between the coupling 10 and the flanged pipe element 82 as the softer polymeric material comprising the second flange 78 is compressed between the metal flanges 90 and 52, which may comprise cast iron, steel or other durable metals.

Couplings according to the invention provide advantages over prior art methods and couplings for joining non-flanged polymeric pipe elements to flanged pipe elements. Being in a pre-assembled state, couplings according to the invention reduce the number of parts that must be handled during installation. Furthermore, the step of fusing a butt flange adapter to the non-flanged polymer pipe element is eliminated along with the need for a fusing machine. Installation time and complexity is thereby reduced substantially.

What is claimed is:

1. A coupling for joining a flanged pipe element to a plain end pipe element, said coupling comprising:
    a plurality of segments attached to one another in spaced apart relation end to end surrounding a central space, each of said segments having an exterior surface and comprising:
    a first side and a second side oppositely disposed;
    a first channel positioned proximate to said first side and extending circumferentially around and facing said central space;
    a first flange positioned proximate to said second side, said first flange comprising a root proximate to said central space and a free edge distal thereto, said first flange extending outwardly away from said central space and said exterior surface of said segment in a direction from said root toward said free edge, said first flange having a plurality of holes therethrough positioned outwardly of said exterior surface of said segment and between said root and said free edge, wherein each of said holes is configured to receive a respective fastener;
    a second channel positioned between said first channel and said first flange and extending circumferentially around and facing said central space; wherein said coupling further comprises:
    a split ring positioned in said first channel, said split ring having a single gap and adapted to be collapsible to a smaller diameter to permit said segments to be drawn toward one another;
    a seal positioned in said second channel;
    a tube positioned within said central space and extending outwardly from said second sides of said segments, said tube comprising a radially facing outer surface engaging said seal.

2. The coupling according to claim 1, wherein said first channel comprises:
    two side surfaces arranged in spaced relation;
    a floor surface extending between said side surfaces, said floor surface comprising a first surface portion and a second surface portion arranged respectively at opposite ends of said segments and a third surface portion positioned therebetween, said first and second surface portions each having a radius of curvature greater than a radius of curvature of said third surface portion.

3. The coupling according to claim 2, wherein said radius of curvature of said first and second surface portions on at least one of said segments is equal to an outer radius of curvature of said split ring.

4. The coupling according to claim 2, wherein at least one of said first and second surface portions has a length extending from 5% to 45% of a total circumferential length of said first channel.

5. The coupling according to claim 2, wherein at least one of said segments has at least one notch positioned in said two side surfaces adjacent to an end of said at least one segment.

6. The coupling according to claim 1, wherein said seal comprises a flexible, resilient sealing ring having a first ring inner surface and a second ring inner surface adapted to respectively engage outer surfaces of said tube and said plain end pipe element, one of said ring inner surfaces having a diameter sized to receive said plain end pipe element upon insertion of said plain end pipe element between said segments.

7. The coupling according to claim 6, wherein said seal has an outer surface engaged with and supporting said segments in a preassembled state in spaced apart relation sufficient to allow said plain end pipe element to be inserted into said central space.

8. The coupling according to claim 1, wherein said split ring has an outer radius of curvature and an inner radius of curvature, said inner radius of curvature being equal to or greater than an outer radius of said plain end pipe element.

9. The coupling according to claim 1, wherein said split ring supports said segments in a preassembled state in spaced apart relation sufficient to allow said plain end pipe element to be inserted into said central space.

10. The coupling according to claim 9, wherein said split ring has sufficient stiffness to maintain said segments in said preassembled state through handling of said coupling during insertion of said plain end pipe element.

11. The coupling according to claim 1, wherein said split ring comprises a plurality of teeth arranged in spaced relation to one another and extending circumferentially around said split ring, said teeth projecting toward said central space.

12. The coupling according to claim 1, wherein said plurality of segments comprises no more than two said segments.

13. The coupling according to claim 12, wherein each said segment comprises adjustable attachment members located at opposite ends thereof.

14. The coupling according to claim 13, wherein said adjustable attachment members comprise projections extending from opposite ends of each said segment, each said projection defining an opening for receiving a fastener.

15. The coupling according to claim 1, further comprising a second flange extending outwardly from said tube and positioned adjacent to said first flange.

16. The coupling according to claim 1, further comprising a barb extending outwardly from said tube proximate one end thereof.

* * * * *